Oct. 26, 1943.       K. F. TROMP       2,332,953
APPARATUS FOR INDICATING AND ADJUSTING THE
SPECIFIC GRAVITY OF SUSPENSIONS
Filed June 4, 1940        2 Sheets-Sheet 1

INVENTOR:
Klaas F. Tromp
BY
ATTORNEY

Oct. 26, 1943. K. F. TROMP 2,332,953
APPARATUS FOR INDICATING AND ADJUSTING THE
SPECIFIC GRAVITY OF SUSPENSIONS
Filed June 4, 1940 2 Sheets-Sheet 2
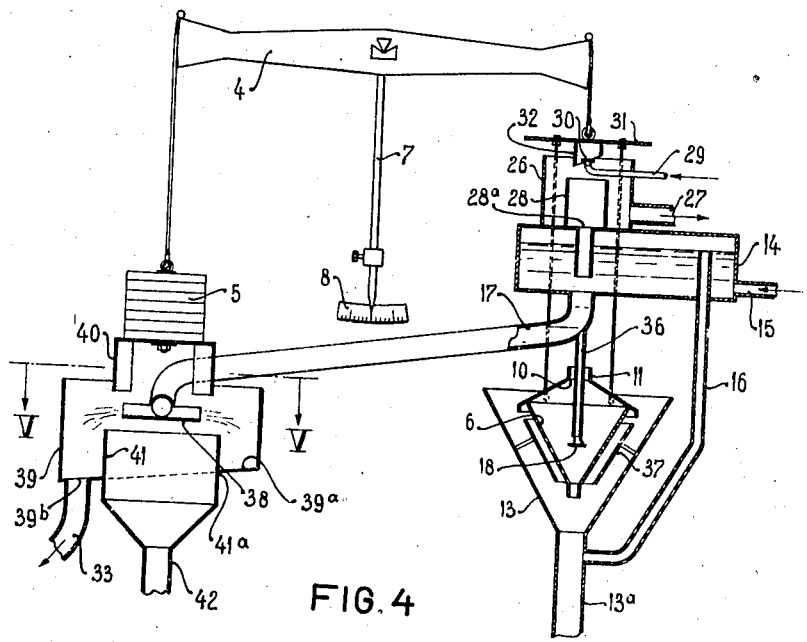
FIG. 4
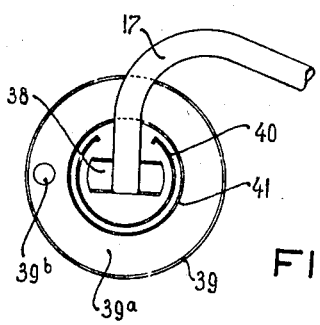
FIG. 5
FIG. 3a
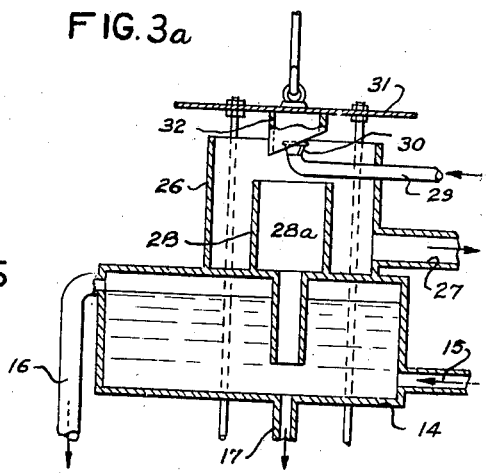
INVENTOR:
Klaas F. Tromp
BY Maxwell E. Sparrow
ATTORNEY Patented Oct. 26, 1943

2,332,953

UNITED STATES PATENT OFFICE 2,332,953

APPARATUS FOR INDICATING AND ADJUSTING THE SPECIFIC GRAVITY OF SUSPENSIONS

Klaas F. Tromp, Kerkrade, Limburg, Netherlands; vested in the Alien Property Custodian Application June 4, 1940, Serial No. 338,794
In Great Britain June 5, 1939

1 Claim. (Cl. 137—78)

This invention relates to improved apparatus for continuously determining and, if desired, adjusting the specific gravity of a suspension of comminuted solids, e. g. sand, in a liquid, e. g. water, to be used for separating materials of different specific gravities, for instance in a manner as disclosed by my prior U. S. patent specification 2,139,047.

In accordance with this invention, the suspension is continuously fed into a substantially closed vat, which actually forms the weighing pan of a weighing apparatus fitted with weight indicating means, and which is provided, in addition to restricted outlet openings both at top and bottom, with a suspension inlet pipe passing with some clearance through one of said openings and preferably equipped with means compelling the suspension to flow into the vat, intermediate top and bottom openings, along a substantially horizontal path.

Owing to this construction, the vat during operation always remains completely filled with suspension that is continuously replenished and homogenized, since the discharge of the inflowing suspension both at the top and at the bottom prevents the comminuted solids from settling.

The weight indicating means of the weighing apparatus disclose any deviation from the desired specific weight of the suspension in the vat and thereby allow the operator to either dilute or concentrate the suspension, as circumstances require. Alternatively, said means may be associated with a device for automatically adjusting the specific gravity of the suspension.

In order that my invention may be well understood by those skilled in the art, I shall now proceed to describe the same with reference to the annexed diagrammatic drawings, which illustrates, by way of example only, three different apparatuses embodying the features of said invention.

Figures 1, 2:
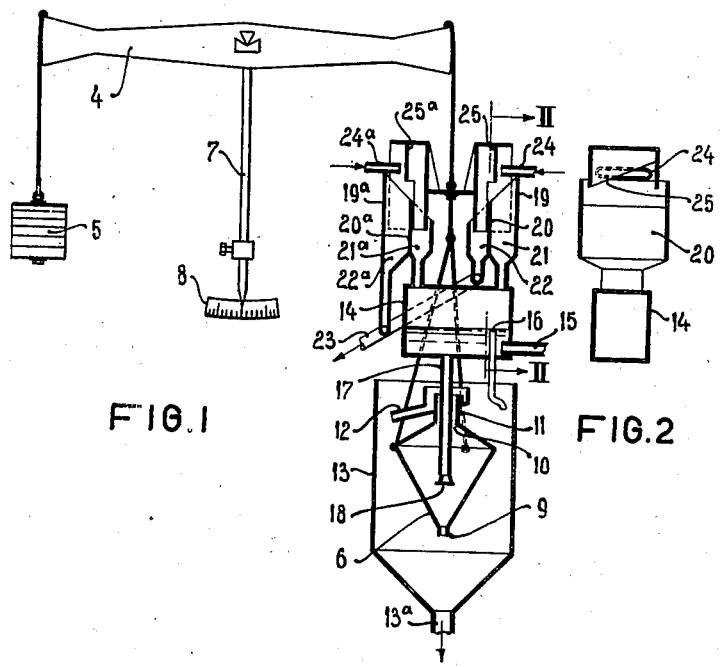
Figure 3:
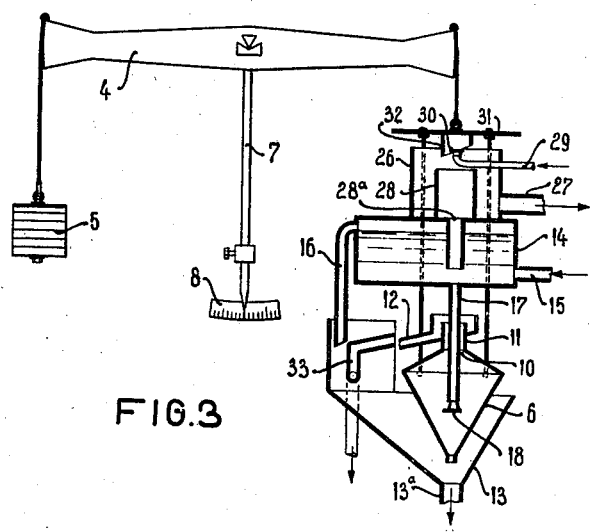

Fig. 1 is partly an elevation, partly a vertical section of the first embodiment, Fig. 2 is a sectional view along the line II—II in Fig. 1, Fig. 3 is partly an elevation, partly a vertical section of the second embodiment, Fig. 3a is a vertical section of a portion of Fig. 3 on a larger scale, Fig. 4 is partly an elevation, partly a vertical section of the third embodiment, and Fig. 5 is a plan sectional view along the line V—V in Fig. 4.

In Fig. 1, the reference numeral 4 designates the weighing beam of a weighing apparatus. Suspended from one arm of said beam is a weight 5, and suspended from the other is a vat 6. Secured to beam 4 is a pointer 7 cooperating with a dial 8.

Vat 6 is double-cone-shaped and is provided with a relatively small bottom opening 9 and a somewhat larger top opening 10. Fitted around the edge of opening 10 is a cylindrical shell 11 surrounded by an annular chute having an inclined spout 12.

The vat 6 and the chute with spout 12 are enclosed by a stationary open top receptacle 13 having a discharge bottom opening 13a.

Mounted some distance vertically above receptacle 13 is a stationary tank 14 provided near its bottom with an inlet 15. Said tank is further fitted with an overflow pipe 16 discharging into receptacle 13, and with a vertical outlet pipe 17 passing with some clearance through the shell 11 and opening about in the centre of vat 6.

Secured to the lower end of pipe 17 and suitably spaced therefrom is a horizontal baffle 18.

The device described so far can be used for continuously determining the specific gravity of a suspension fed into tank 14 by pipe 15. Provided the rate of feed to be sufficient, the level of the suspension in said tank will always coincide with that of the top opening of overflow pipe 16. From said tank, the suspension will flow, through pipe 17, into the vat 6, which will be kept completely filled thereby, the excess being discharged, both through the bottom opening 9 and through the spout 12, into the receptacle 13, whence it is discharged by the outlet 13a. Owing to the presence of baffle 18, the suspension enters the vat 6 in substantially horizontal direction, so that its vertical reaction on the vat is approximately nil.

Since the vat 6 is thus always kept filled with a predetermined amount of homogenized suspension, the weight indicated by pointer 8 will also indicate the specific gravity of the suspension. As long as the specific gravity of the suspension entering the tank 14 remains constant, pointer 8 will remain stationary. Movement of the pointer in the one or in the other direction will indicate that the suspension is to be diluted or concentrated.

Meanwhile, the apparatus described so far is also suitable for cooperation with means adapted to directly correct the desired specific gravity of the suspension in tank 14. These means are also illustrated in Fig. 1, and will now be described.

Mounted on the top of tank 14 are two casings 19 and 19a divided, by vertical partitions 20 and 20a, respectively, into two compartments 21, 22 and 21a, 22a, respectively. The bottom outlets of compartments 21 and 21a open into tank 14, but the bottom outlets of compartments 22 and 22a open into a common discharge pipe 23. The casings 19 and 19a are further provided with elongated liquid inlets 24 and 24a, respectively, opening vertically above the compartments 21 and 22a, respectively.

Attached to the means whereby vat 6 is suspended from the beam 4 is a structure comprising, in addition to the required vertical guide walls, two vertical baffles 25 and 25a having slanting bottom edges and arranged in front of the inlets 24 and 24a, respectively, in such a manner as to allow part of the liquid supplied by said inlets to flow into compartments 22 and 21a, respectively, the other part being compelled by said baffles to vertically fall into compartments 21 and 22a, respectively, as will be understood from Fig. 2. Upward movement of the baffles 25, 25a will increase the proportion of the liquid fed to compartments 22, 21a and reduce the proportion of the liquid supplied to compartments 21, 22a, whereas downward movement of the baffles will have the opposite effect.

If pipe 15 is obturated, and inlets 24, 24a are in communication, through suitable conduits, with receptacles (not shown) filled with suspensions of relatively low and of relatively high specific gravity, respectively, which suspensions are to be mixed continuously to form a suspension of predetermined medium specific gravity to be discharged from receptacle 13, then, as will be understood, tank 14 will receive part of the light suspension supplied through inlet 24, and also part of the heavy suspension supplied through inlet 24a, the balance being discharged through pipe 23.

The mixture formed in tank 14 is supplied to vat 6, which, as hereinbefore described, will be kept completely filled with a homogeneous suspension. If said mixture has the desired specific gravity (the value of which is determined by the weight 5), the vat 6 remains poised, and this means that the baffles 25, 25a assume the correct positions in relation to the densities of the suspension supplied by inlets 24 and 24a, respectively.

Assuming now the specific gravity of the suspension in tank 14, and consequently in vat 6 to increase, vat 6 will descend, whereby baffles 25, 25a will also move downward, so that the proportion of light suspension supplied to tank 14 increases and the proportion of heavy suspension supplied to said tank is reduced, the result being that the specific gravity of the mixture in the tank will fall. In the opposite case, vat 6 and baffles 25, 25a will rise and cause the specific gravity of the mixture in tank 14 to increase. Thus, the desired specific gravity will always be automatically restored.

It will be understood that the mixture in tank 14 may also be composed of a relatively heavy suspension and clean water, in which case inlet 24 should communicate with a water reservoir.

Fig. 3 of the drawing illustrates another apparatus by means of which a relatively heavy suspension, for instance from a thickener, may be diluted to produce a suspension of predetermined medium specific gravity. In this figure, parts corresponding to parts shown in Fig. 1 are designated by the same reference numerals, so that they need not further be described.

Mounted on the top wall of tank 14 is a cylindrical vessel 26 provided near its bottom with an outlet 27, and mounted within said vessel is a cylindrical shell 28 around an opening 28a in the top wall of said tank. As shown, the top edge of shell 28 is situated at a lower level than that of vessel 26. Passed through the wall of vessel 26 is a pipe 29, the open end of which is located vertically above shell 28 and is turned upwards. Secured to this pipe is a horizontal baffle 30 just opposite to, but suitably spaced from its open end.

The means whereby vat 6 is suspended from the weighing beam 4 support a horizontal plate 31, to the bottom face of which is secured a cylindrical shell 32 coaxially with shell 28. The bottom edge of shell 32 lies in an inclined plane.

Passed through the wall of the receptacle 13 is a vertical pipe 33, the upper portion of which forms the continuation of spout 12, if vat 6 assumes the position corresponding to the desired specific gravity of the suspension contained therein.

Relatively heavy suspension as from a thickener is supplied to tank 14 through pipe 15, and clean water is supplied through pipe 29. The water thus supplied, tends, by its impact against baffle 30, to radially flow into the annular space between shells 26 and 28, whence it is discharged by pipe 27. Part of said water, however, is compelled by shell 32 to fall more or less vertically into the space confined by shell 28, whence it flows into tank 14 to form, together with the heavy suspension supplied by pipe 15, a suspension of medium density. If this suspension has the desired specific gravity as determined by weight 5, the vat 6 remains poised, and this means that the shell 32 assumes the correct position.

Downward or upward movement of vat 6, owing to increase or decrease of the specific gravity of the suspension contained therein, will result in a corresponding movement of shell 32 and, as a consequence, to increase or decrease of the proportion of clean water supplied to tank 14.

If vat 6 assumes its correct position, the suspension from spout 12 will be discharged through pipe 33 to be used for the purpose stated, the balance being discharged by outlet 13a and returned to the thickener. Should the suspension in vat 6 be too dense, or too diluted, the spout 12 will assume a position below or above the mouth of pipe 33, whereby said suspension is discharged into receptacle 13.

In practice it has been found that the apparatus described with reference to Figs. 1–3, although giving satisfactory results, requires a comparatively large sized vat 6. This is due to the fact that the full amount of suspension to be discharged by duct 33 has to pass said vat, so that it is necessary not only for pipe 17, but also for the cross sectional area of the annular clearance between said pipe and the cylindrical shell 11, and consequently for said shell itself, to be amply sized, whereas a large diameter of shell 11 in turn requires a large sized vat 6 since accurate results can only be obtained if the diameter of shell 11 is small relative to the capacity of said vat. In view thereof it may be desirable for vat 6 to be by-passed by the suspension of the desired density, for instance in a manner as shown in Figs. 4 and 5.

In said figures, parts corresponding to parts shown in Figs. 1 and 3 are designated by the same reference numerals, so that they need not be described again.

In apparatus as illustrated in Figs. 4 and 5, suspension overflowing vat 6 is always discharged into receptacle 13, the same as in apparatus in accordance with Figs. 1 and 2. However, said liquid simply flows over the top face of the upper cone of vat 6. In order that this liquid shall not splash and thereby cause undesired movement of said vat, the latter is enclosed by an inverted truncated cone 37 suitably spaced therefrom and secured to receptacle 13.

Only a small portion of the liquid discharged from tank 14 by pipe 17 is fed, through a vertical branch 36 of said pipe, to vat 6. The pipe 17 itself opens a small distance above a stationary, horizontal baffle 38 enclosed by a receptacle 39 having an inclined bottom 39ª provided, at its lowest level, with a bottom opening 39ᵇ communicating with pipe 33.

Mounted in receptacle 39 around a central bottom opening 41ª is a hopper 41 provided with a discharge pipe 42.

Secured to the bottom face of counterweight 5 is a bell 40 mounted in concentric relation with baffle 38 and extending downward so far as to normally allow liquid, which is radially discharged by said baffle, to flow into the annular space confined between hopper 41 and the wall of receptacle 39. However, if the suspension in tank 14 is not dense enough and counterweight 5, as a consequence, descends, bell 40 will assume a position relative to baffle 38 as to compel the suspension from pipe 17 to flow into hopper 41, whence it is returned, by pipe 42, to the thickener (not shown), which also receives the liquid discharged by pipe 13ª.

What I claim is:

An apparatus of the class described, the combination of a weighing device having an index and a pivoted arm, one end of said arm carrying a counter weight, a receptacle carried by the other end of said arm, said receptacle being provided with a top inlet and a bottom outlet, a tank for fluid mounted above the receptacle and having an outlet pipe with its free end extended into the receptacle through said inlet, a liquid supply pipe above the tank and means carried by the said arm above the supply pipe and movable with said receptacle to divert liquid from the supply pipe into the tank.

KLAAS F. TROMP.